US009792363B2

(12) United States Patent
McConville et al.

(10) Patent No.: US 9,792,363 B2
(45) Date of Patent: Oct. 17, 2017

(54) VIDEO DISPLAY METHOD

(75) Inventors: Ryan Patrick McConville, Brooklyn, NY (US); Bhupendra Singh, Uttar Pradesh (IN); Prashant Pandey, San Jose, CA (US); Chhavi Upadhyay, Fremont, CA (US); Srikanth Kakani, Fremont, CA (US)

(73) Assignee: VDOPIA, INC., Fremont, CA (US)

( * ) Notice: Subject to any disclaimer, the term of this patent is extended or adjusted under 35 U.S.C. 154(b) by 30 days.

(21) Appl. No.: 13/019,210

(22) Filed: Feb. 1, 2011

(65) Prior Publication Data

US 2012/0194734 A1 Aug. 2, 2012

(51) Int. Cl.

*H04N 7/173* (2011.01)
*G06F 17/30* (2006.01)

(Continued)

(52) U.S. Cl.

CPC ................ *G06F 17/30846* (2013.01); *H04N 21/234327* (2013.01); *H04N 21/234381* (2013.01);

(Continued)

(58) Field of Classification Search

CPC ....... H04N 21/23412; H04N 21/23409; H04N 21/234336; H04N 21/234381;

(Continued)

(56) References Cited

U.S. PATENT DOCUMENTS 5,459,830 A * 10/1995 Ohba et al. .................. 345/473
5,714,997 A * 2/1998 Anderson ...................... 348/39

(Continued)

FOREIGN PATENT DOCUMENTS

KR 2005096625 * 10/2005
KR 2005096625 A * 10/2005

*Primary Examiner* — An Son P Huynh

(74) *Attorney, Agent, or Firm* — Haynes and Boone, LLP

(57) ABSTRACT

A method for video playback uses only resources universally supported by a browser ("inline playback") operating in virtually all handheld media devices. In one case, the method first prepares a video sequence for display by a browser by (a) dividing the video sequence into a silent video stream and an audio stream; (b) extracting from the silent video stream a number of still images, the number of still images corresponding to at least one of a desired output frame rate and a desired output resolution; and (c) combining the still images into a composite image. In one embodiment, the composite image having a number of rows, with each row being formed by the still images created from a fixed duration of the silent video stream. Another method plays the still images of the composite image as a video sequence by (a) loading the composite image to be displayed through a viewport defined the size of one of the still images; (b) selecting one of the still images of the composite image; (c) setting the viewport to display the selected still image; and (d) setting a timer for a specified time period based on a frame rate, such that, upon expiration of the specified time period: (i) selecting a next one of the still images to be displayed in the viewport, unless all still images of the composite image have been selected; and (ii) return to step (c) if not all still images have been selected.

32 Claims, 6 Drawing Sheets

(51) Int. Cl.

| | |
|---|---|
| ***H04N 21/2343*** | (2011.01) |
| ***H04N 21/414*** | (2011.01) |
| ***H04N 21/43*** | (2011.01) |
| ***H04N 21/431*** | (2011.01) |
| ***H04N 21/4782*** | (2011.01) |
| ***H04N 21/61*** | (2011.01) |
| ***H04N 21/81*** | (2011.01) |
| *H04N 21/485* | (2011.01) |

(52) U.S. Cl.
CPC ... *H04N 21/41407* (2013.01); *H04N 21/4307* (2013.01); *H04N 21/4316* (2013.01); *H04N 21/4782* (2013.01); *H04N 21/6125* (2013.01); *H04N 21/812* (2013.01); *H04N 21/8153* (2013.01); *H04N 21/4852* (2013.01)

(58) Field of Classification Search
CPC ......... H04N 21/25825; H04N 21/4258; H04N 21/44012; H04N 21/440236; H04N 21/44029; G06F 17/30846
USPC .......................................... 725/116; 715/723
See application file for complete search history.

(56) References Cited

U.S. PATENT DOCUMENTS 5,818,439 A * 10/1998 Nagasaka ......... G06F 17/30793 348/E7.073
6,081,551 A 6/2000 Etoh
6,185,363 B1 * 2/2001 Dimitrova et al. ........... 386/243
6,230,162 B1 * 5/2001 Kumar et al. ................ 382/240
6,304,174 B1 * 10/2001 Smith et al. .................. 340/471
6,337,883 B1 * 1/2002 Tanaka ................. H04N 7/0112 348/E7.015
6,342,904 B1 * 1/2002 Vasudevan ........... H04N 19/587 375/E7.253
6,356,921 B1 * 3/2002 Kumar et al. ................ 715/203
6,546,146 B1 * 4/2003 Hollinger ................ G06T 9/008 375/240.03
6,549,215 B2 * 4/2003 Jouppi .......................... 345/660
6,654,541 B1 * 11/2003 Nishi et al. ................... 386/240
6,750,919 B1 * 6/2004 Rosser .......................... 348/584
6,833,865 B1 * 12/2004 Fuller et al. ............... 348/231.2
6,856,997 B2 * 2/2005 Lee et al.
6,870,573 B2 * 3/2005 Yeo et al. ..................... 348/569
6,937,273 B1 * 8/2005 Loui .......................... 348/220.1
6,956,573 B1 * 10/2005 Bergen .............. G06F 17/30802 345/473
7,254,824 B1 * 8/2007 Gordon et al. ................. 725/54
7,313,808 B1 * 12/2007 Gupta et al. .................... 725/89
7,401,351 B2 * 7/2008 Boreczky et al. .............. 725/88
7,480,442 B2 1/2009 Girgensohn et al.
7,487,524 B2 * 2/2009 Miyamori ....................... 725/34
7,594,177 B2 * 9/2009 Jojic ................. G06F 17/30852 715/720
7,624,337 B2 * 11/2009 Sull et al. ..................... 715/201
7,673,321 B2 * 3/2010 Yurt ....................... H04H 20/40 725/114
7,779,438 B2 * 8/2010 Davies ............................ 725/32
7,810,049 B2 10/2010 Werwath et al.
7,836,475 B2 * 11/2010 Angiolillo et al. ............. 725/93
7,853,898 B2 12/2010 Clark et al.
7,996,791 B2 * 8/2011 Rashkovskiy ................ 715/838
7,996,878 B1 * 8/2011 Basso et al. .................. 725/135
8,023,769 B2 * 9/2011 Bang et al. ................... 382/284
8,079,054 B1 * 12/2011 Dhawan et al. .............. 725/105
8,117,564 B2 * 2/2012 Woods et al. ................. 715/850
8,223,849 B2 * 7/2012 Lu et al. .................. 375/240.25
8,307,395 B2 * 11/2012 Issa et al. ........................ 725/46
8,479,238 B2 * 7/2013 Chen et al. ..................... 725/86
8,578,273 B2 * 11/2013 MacKenzie ......... G06F 3/04845 715/730
8,756,505 B2 * 6/2014 Gonze et al. ................. 715/721
2001/0005400 A1 6/2001 Tsujii et al.
2001/0043794 A1 11/2001 Akiba et al.
2002/0144262 A1 * 10/2002 Plotnick et al. ................ 725/32
2002/0167607 A1 * 11/2002 Eerenberg et al. ........ 348/439.1
2003/0103670 A1 * 6/2003 Schoelkopf ........... G06T 11/001 382/162
2003/0156757 A1 * 8/2003 Murakawa ........... G06K 9/4609 382/195
2004/0019608 A1 * 1/2004 Obrador ..................... 707/104.1
2004/0022453 A1 * 2/2004 Kusama et al. .............. 382/284
2004/0042766 A1 3/2004 Mizushiri
2004/0103446 A1 * 5/2004 Yagi .............. H04N 21/234363 725/146
2004/0150723 A1 * 8/2004 Seo et al. ................... 348/207.1
2004/0197088 A1 * 10/2004 Ferman et al. ............... 386/117
2004/0227768 A1 * 11/2004 Bates ................ G06F 17/30855 345/589
2005/0028194 A1 * 2/2005 Elenbaas ........... G06F 17/30787 725/32
2005/0044499 A1 * 2/2005 Allen ................ G06F 17/30038 715/704
2005/0062888 A1 3/2005 Wood et al.
2005/0068335 A1 * 3/2005 Tretter et al. ................. 345/619
2005/0281535 A1 * 12/2005 Fu et al. ......................... 386/69
2007/0019889 A1 * 1/2007 Miller ................. G06F 3/04842 382/305
2007/0024705 A1 * 2/2007 Richter et al. ................ 348/142
2007/0058937 A1 3/2007 Ando et al.
2007/0067305 A1 3/2007 Ives
2007/0147706 A1 6/2007 Sasaki et al.
2007/0154164 A1 * 7/2007 Liu ...................... G11B 27/034 386/233
2007/0168864 A1 * 7/2007 Yamamoto et al. .......... 715/716
2007/0203942 A1 * 8/2007 Hua et al. .................. 707/104.1
2007/0250901 A1 * 10/2007 McIntire et al. .............. 725/146
2007/0268406 A1 11/2007 Bennett
2007/0274672 A1 * 11/2007 Itoi ...................... H04N 9/7921 386/241
2008/0094419 A1 * 4/2008 Leigh et al. .................. 345/660
2008/0094487 A1 * 4/2008 Tojima ..................... 348/231.99
2008/0097970 A1 * 4/2008 Olstad et al. ..................... 707/3
2008/0154941 A1 6/2008 Park
2009/0021592 A1 * 1/2009 Oyama et al. ............. 348/220.1
2009/0089056 A1 * 4/2009 Fujii ................. G06F 17/30746 704/246
2009/0115901 A1 * 5/2009 Winter ................... H04N 5/262 348/565
2009/0119736 A1 * 5/2009 Perlman et al. .............. 725/133
2009/0158326 A1 6/2009 Hunt et al.
2010/0091184 A1 4/2010 Nitta
2010/0158109 A1 6/2010 Dahlby et al.
2010/0192106 A1 * 7/2010 Watanabe et al. ............ 715/838
2010/0262280 A1 10/2010 Miller et al.
2011/0008017 A1 * 1/2011 Gausereide .......... G11B 27/034 386/280
2011/0033113 A1 * 2/2011 Sakaguchi ........ G06F 17/30781 382/190
2011/0058788 A1 * 3/2011 Asao et al. ................... 386/243
2011/0087794 A1 * 4/2011 Li ......................... H04N 5/765 709/231
2012/0057802 A1 * 3/2012 Yuki et al. .................... 382/243
2012/0311649 A1 * 12/2012 Patten .................... G06Q 30/02 725/97

* cited by examiner

VIDEO DISPLAY METHOD

BACKGROUND OF THE INVENTION

1. Field of the Invention

The present invention relates to handheld mobile devices. In particular, the present invention relates to playing video on a handheld mobile device.

2. Discussion of the Related Art

Video advertising is an important vehicle for promoting a product or a service on television, on-line devices or mobile devices. It is anticipated that video advertising will be equally important in the coming Internet-enabled television applications. However, current hand-held media devices (e.g., iPad, iPhone, Android devices) implement the HTML5 specification in so many different ways as to make it difficult for video advertising providers to provide a standard method for delivering video advertising. Specifically, because most hand-held media devices play video only in native mode, playing a video embedded in a web page is accomplished only by suspending the browser application and transferring control to a native media player. The file formats expected by the native media players vary among the handheld media devices. Therefore, it is difficult for a website owner to embed on a webpage a video clip that can be played by a large number of hand-held media devices. Further, the user is required to activate a link to start the native media player. Thus, support for video advertising in current handheld media devices is unsatisfactory.

SUMMARY

The present invention provides a method for video playback using only resources universally supported by a browser ("inline playback") operating in virtually all hand-held media devices. Such a video display method is particularly valuable because it enables video playback even on browsers with limited capabilities. Such a method is particularly beneficial to video advertising on mobile media devices, without requiring complex codecs.

According to one embodiment of the present invention, a method prepares a video sequence for display by a browser. The method includes (a) dividing the video sequence into a silent video stream and an audio stream; (b) extracting from the silent video stream a number of still images, the number of still images corresponding to at least one of a desired output frame rate and a desired output resolution; and (c) combining the still images into a composite image. In one embodiment, the composite image having a number of rows, with each row being formed by the still images created from a fixed duration of the silent video stream.

According to one embodiment of the present invention, the method for preparing a video sequence for display by a browser further comprises applying heuristic algorithms to the composite image to facilitate smooth video playback.

According to one embodiment of the present invention, the method for preparing a video sequence for display by a browser further comprises compressing the composite image, using one or more of JPEG- and Huffman-based compression algorithms.

According to one embodiment of the present invention, a method plays a composite image of the present invention, which includes a number of still images as a video sequence. The method comprises: (a) loading the composite image to be displayed through a viewport defined the size of one of the still images; (b) selecting one of the still images of the composite image; (c) setting the viewport to display the selected still image; and (d) setting a timer for a specified time period based on a frame rate, such that, upon expiration of the specified time period: (i) selecting a next one of the still images to be displayed in the viewport, unless all still images of the composite image have been selected; and (ii) return to step (c) if not all still images have been selected.

According to one embodiment of the present invention, the method which plays the composite image as a video sequence has the still images arranged in a multiple-row array. In that embodiment, each row of the multiple-raw array is formed by still images obtained from a video sequence, the number of still images in each row being related to a fixed time duration.

According to one embodiment of the present invention, the method which plays the composite image as a video sequence synchronizes setting of the selected still image for display with an audio stream.

According to one embodiment of the present invention, the method which plays the composite image as a video sequence may be implemented as an add-on to a web browser. Such an add-on may be implemented by a script written in an industry standard scripting language, such as javascript.

In one embodiment of the present invention, the video sequence is played when a user of an internet-enabled device makes a selection from a web page displayed on a graphical display. The selection may be made by clicking on an icon, such as a mute button.

The methods of the present invention allow a video advertising vendor to offer a standard and scalable method to a website owner to display video advertising on any web browser, regardless of the native format adopted by the handheld media player. Consequently, a network is created to enable running video advertising across many handheld media devices.

The present invention is better understood upon consideration of the detailed description below and the accompanying drawings.

BRIEF DESCRIPTION OF THE DRAWINGS

FIG. 2 represents specifying a still image to be displayed in a viewport by a playback module implementing a method of the present invention.

DETAILED DESCRIPTION OF THE PREFERRED EMBODIMENTS

Figure 6:
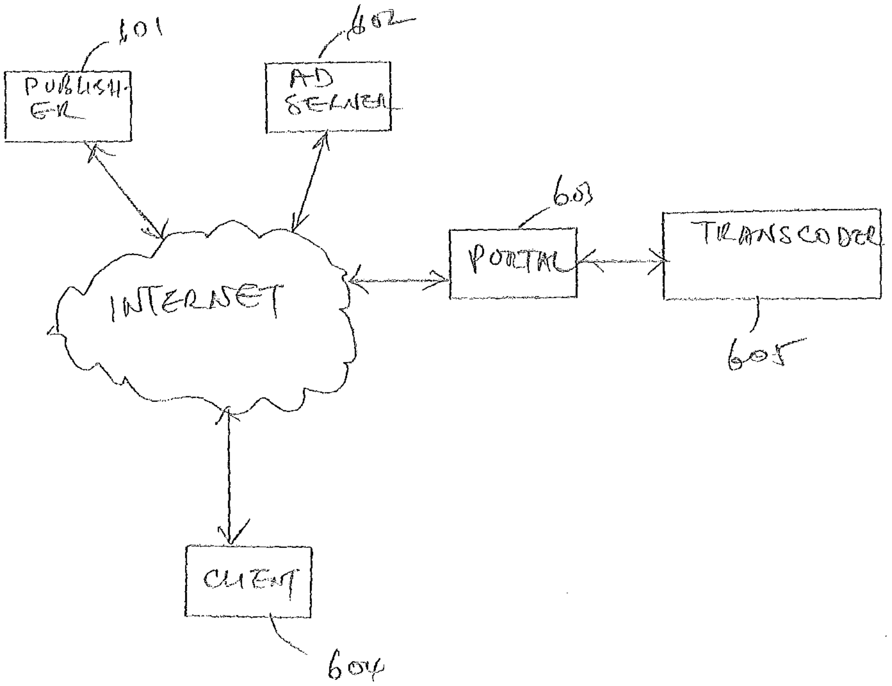
FIG. 6 provides exemplary system 600, in accordance with one embodiment of the present invention.

Although this detailed description is provided in the context of video advertising, the present invention is applicable to displaying any video format data. FIG. 6 provides exemplary system 600, in accordance with one embodiment of the present invention. As shown in FIG. 6, an advertising or campaign manager at an advertising company uploads a typical 16×9, or a 4×3 video sequence for use in advertising on to an advertising portal site 603. As known to those skilled in the art, a video sequence is a group of images (frames) to be played at a specified frame-rate; most video sequences also include a synchronized audio stream. A video sequence that is played on a mobile hand-held media device is typically played at 15 frames per second at a frame rate and a 480×272 (i.e., 16×9 aspect ratio) resolution, and 192 kbps sound. A typical video sequence used for advertising may be 10-15 seconds long. The advertising or campaign manager may provide further information, such as site targeting and other targeting parameters (e.g., the type of websites to run the advertising, and how frequent it should be run).

Figure 1:
FIG. 1 shows a composite image formed by still images extracted from four seconds of a video stream, at a frame rate of 15 frames per second, in accordance with one embodiment of the present invention.

Portal site 603 provides transcoder module 605 which re-encodes the uploaded video into a playback-friendly format (described below). Transcoder module 605 performs the following steps:

1. Dividing the video sequence into a silent video stream and an audio stream;
2. Separately storing the audio stream into a separate file;
3. Extracting from the silent video stream a number of still images, the number of still images to provide is determined by the desired output frame-rate and the desired output resolution;
4. Combining the still images into a composite image consisting of a number of rows, each row being formed by the still images created from a one-second segment of the silent video stream (FIG. 1 shows a composite image formed by still images extracted from four seconds of a video stream, at a frame rate of 15 frames per second, in accordance with one embodiment of the present invention)
5. (optional) Applying heuristic algorithms to the composite image aimed at ensuring smooth video playback (e.g., compiling an index of the still images in the composite image, so as to facilitate calculating each still image's position during playback); and
6. (optional) Compressing the composite image, using one or more JPEG- or Huffman-based compression algorithms (e.g., any suitable compression algorithm that takes advantage of the scenic similarity that exists between successive frames).

Figure 4:
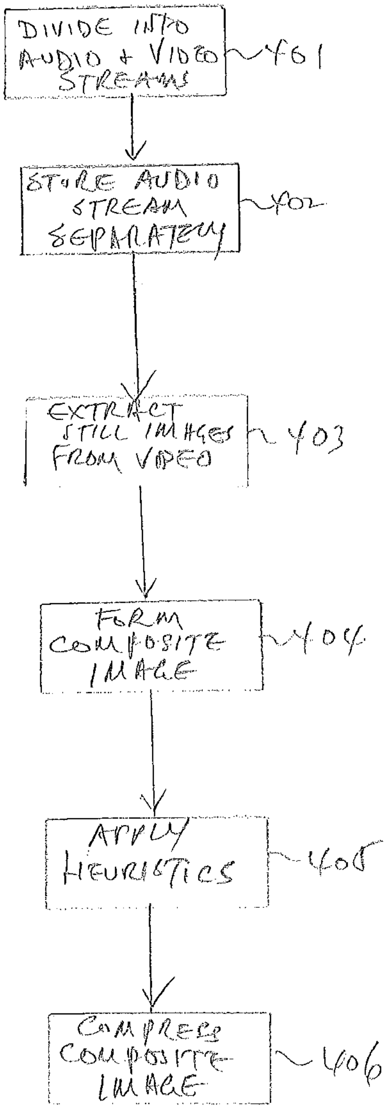
FIG. 4 shows flow chart 400, which summarizes steps 1-6 of a transcoder of the present invention described herein as steps 401-406.

These steps are summarized as steps 401-406 in flow chart 400 of FIG. 4.

Having thus processed, the composite image is made accessible to advertising servers (e.g., advertising server 602), which serves advertising content to websites (e.g., publisher sites 601) conforming to the targeting parameters. For example, when a user (e.g., client 604) requests a web page from publisher server 601, publisher server 601 embeds in the requested web page, code for requesting an advertising company's server (e.g., advertising server 602) for advertising content. Upon receiving the web page, client 604 sends the embedded request to advertising server 602, which selects one or more composite images from its collection of composite images based on the targeting parameters. Advertising server 602 then sends the selected composite images to client 604 with specific playback instructions. In one application ("VDO", indicating playback of video according to a method of the present invention), the playback instructions include frame-size (video resolution), frame-rate, the universal resource locators (URLs) of the composite images, and the display-size. In the example of FIG. 6, communication between various parties take place over the interne. In some embodiments, some communication may take place over one or more private networks. Also, variations and modification of the protocols (e.g., interactions between advertising server 602 and publisher server 601) discussed above are possible.

In one embodiment, transcoder 605 may detect motion in the video sequence and provide a composite image that is to be played back using multiple frame rates (i.e., a less frame rate for relatively still scenes, and a higher frame rate where motion is detected.) In that embodiment, the frame rate information is provided to the playback module along with the composite image.

By dividing a given video sequence into video and audio streams (synchronizing the two streams during playback on the client side) to be separately processed, allows a playback module (described below) to be simply implemented using a scripting language, e.g. Javascript code. This simple approach reduces the overall integration time for incorporating video advertising into a web page to mere minutes, instead of months. Using a frame-by-frame approach, the transcoding module of the present invention therefore takes advantage of a frame-based delivery approach, which allows keeping related frames together to achieve high compression.

A playback module written in a suitable script language (e.g., a script language supported by most (if not all) browsers, such as javascript codes) may be provided to the user's browser.

The playback module processes the composite images produced by the transcoder module. The playback module also manages buffering to deliver a continuous video experience using the component still images in the composite images. The playback module performs the following steps:

1. Loading the first composite image with a viewport defined by the frame-size, such that at any given time, only a still image worth of the composite image is displayed in the viewport;
2. setting the portion of the composite image to be displayed in the viewport to the first still image of the composite image (e.g., the upper left still image, with an index value of 0);
3. setting a timer to instruct the browser to call back the playback module after a specified time, the specified time being the time interval defined by the frame-rate;
4. (entry point) setting the portion of the composite image to be displayed in the viewport, if available, to the next still image of the composite image (e.g., the still image in the composite image to the right of the one currently being displayed, or the image having the next greater index);
5. (optional) Synchronizing the next still image, if available, to be displayed with the audio stream; and
6. If the next still image is available, return to step 3 above.

Figure 5:
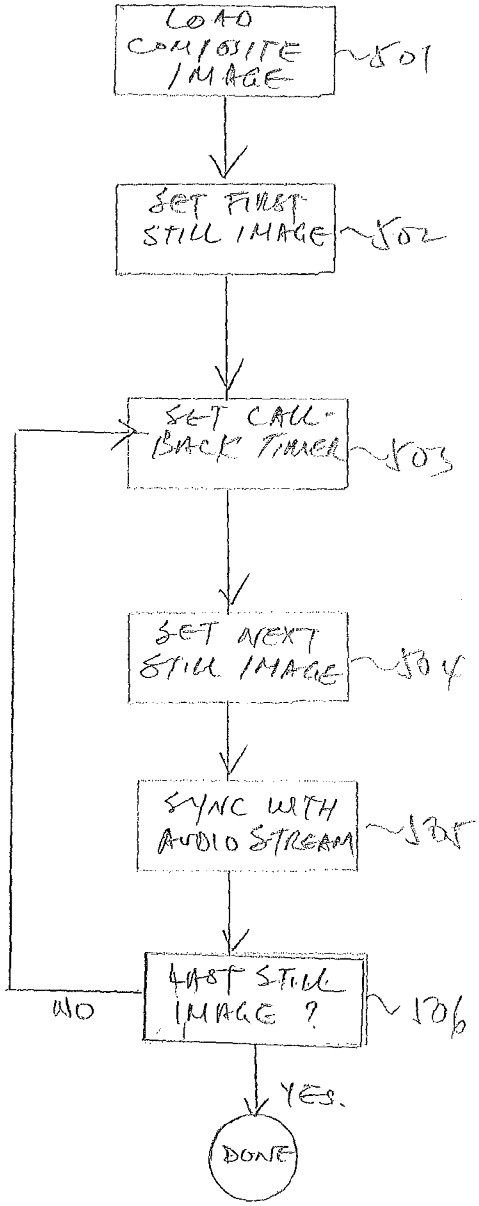
FIG. 5 shows flow chart 500, which summarizes steps 1-6 of a playback module of the present invention described herein as steps 501-506.

These steps are summarized in FIG. 5 by flow chart 500, showing steps 1-6 of the playback module described herein as steps 501-506.

These sequence of steps cause the browser to display the specified still images to be displayed one by one, with each successive still image being displayed for the time period defined by the frame rate, thus achieving a video effect within the browser without invoking the native player on the handheld media device. In one embodiment, where the video is to be played using variable-rate playback, for each still image, the timer is set to its corresponding frame rate, which may change from still image to still image.

Figure 2:
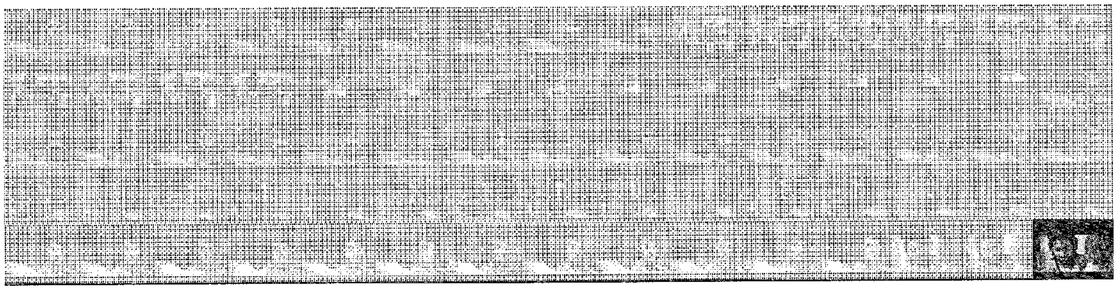
FIG. 2 shows the composite image of FIG. 1, with all component still images "greyed out" except for one.

FIG. 2 shows the composite image of FIG. 1, with all component still images "greyed out" except for one; FIG. 2 represents specifying a still image to be displayed in a viewport by a playback module implementing a method of the present invention. Although this example shows the component still images of the composite image being arranged in a rectangular array in an implicit order, such an arrangement is not necessary. For example, the component still images in the composite image may be arranged in any manner. In one embodiment, indexing information may be provided using a separate file, or through javascript.

The composite image may be composed from or more layers of images. The layers are drawn in proper order to form the final image which is shown to user as a frame. Such an approach enhances data compression and further reduces the total amount of image data transferred. For example, each frame may be decomposed into a portion identical to another frame (the "base frame") and one or more component layers each representing an incremental change in scene from the base frame. Typically the incremental change in scene may be provided using much fewer bits than the base frame, which needed to be sent only once for the many frames that may depend from the base frame.

The method above can also be implemented using the "Canvas" element under the HTML5 standard, although "Canvas" is not as supported on all mobile browsers. In that implementation, a still image to be displayed in the viewport is rendered into a bitmap ("drawn") and copied into the canvas using appropriate application program interface (API) calls every time the timer expires. In some embodiments, the bitmap is a data structure at a specified location in memory.

Figure 3:
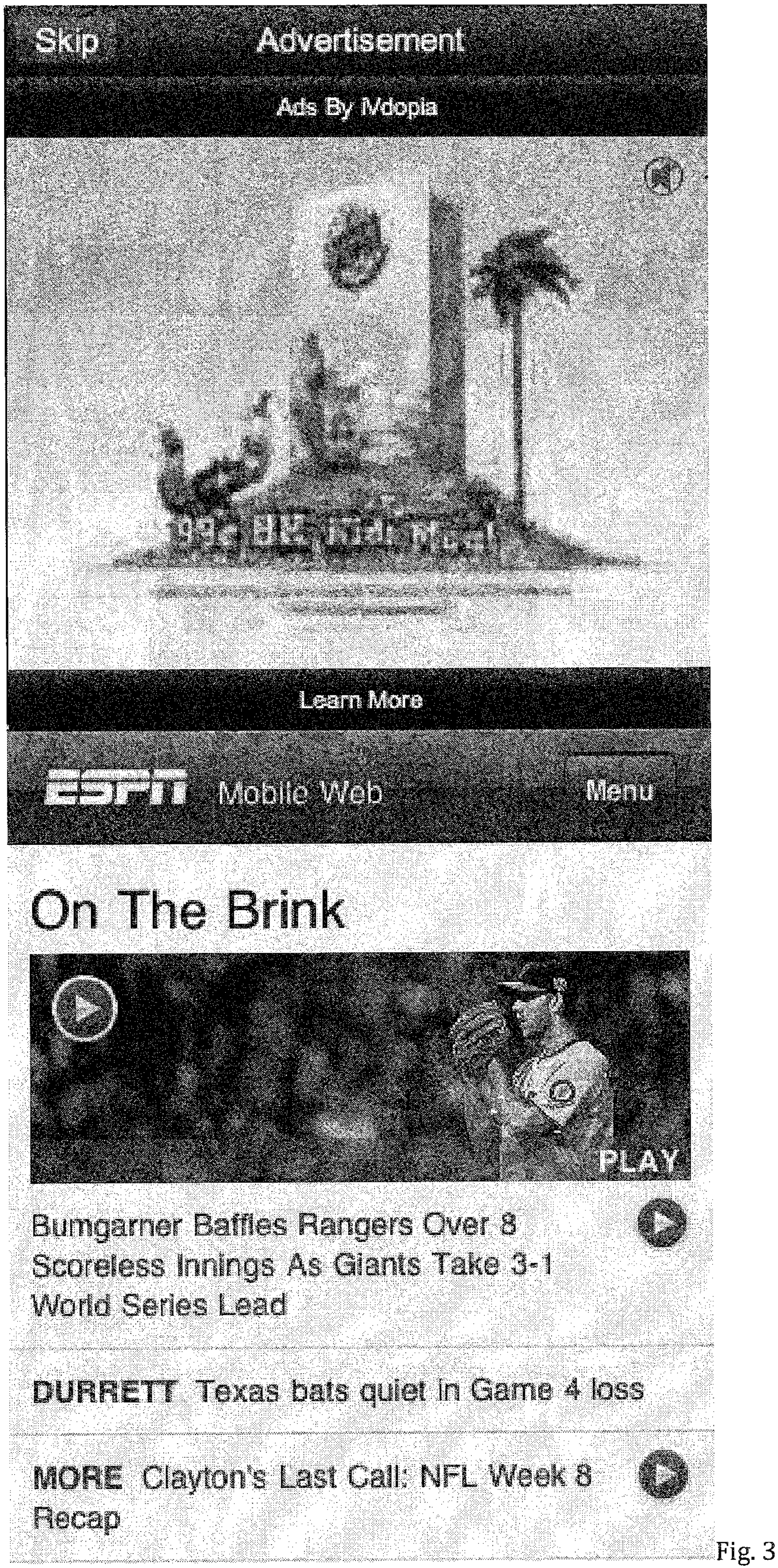
FIG. 3 shows a mute button provided during the replay of video in accordance with one embodiment of the present invention.

Optionally, the playback module can implement a mute button (FIG. 3), so that the user may elect to play the video without the audio stream. In one embodiment, the mute button allows the user to choose playing the original video with sound in fullscreen (as supported by most devices). The mute button provides a click context that enables the playback module to play the video automatically thereby ensuring a desirable browsing experience.

Figure 7:
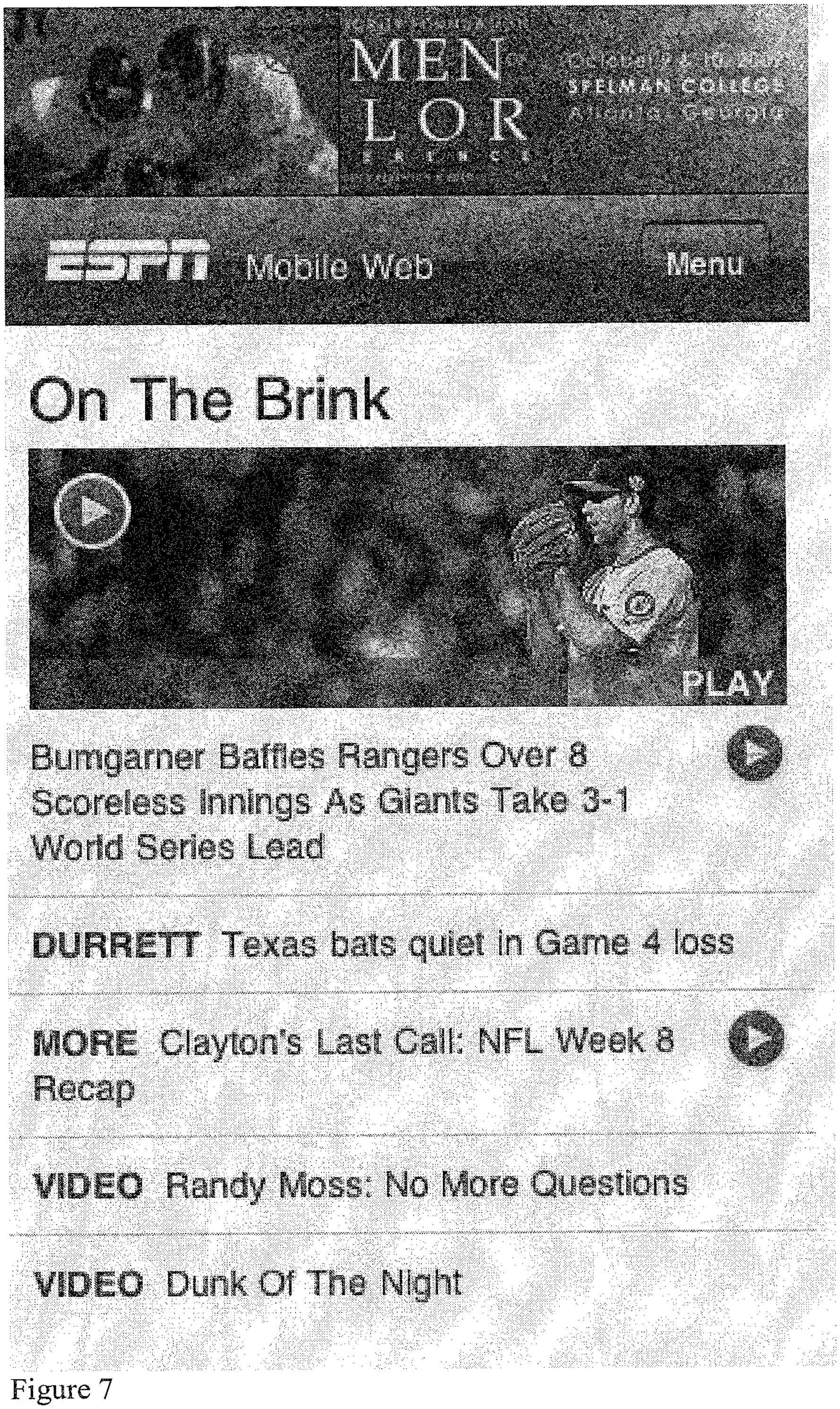
FIG. 7 shows, in one embodiment, a video sequence being played within a viewport placed at the top of a web page where a "banner" is conventionally displayed.

In addition, the viewport for displaying the video sequence according to the present invention may be placed anywhere on the display of the media player. In one embodiment, as shown in FIG. 7, the video sequence can be shown within a viewport placed at the top of a web page where a "banner" is conventionally displayed.

An exemplary playback module written in javascript is provided below to illustrate the techniques described above:

```
<html>
<head>
<meta name="viewport" content="width=device-width; initial-scale=1.0; maximum-scale=1.0; user-scalable=0;"/>
<title>iVdopia WAP ads demo</title>
<link rel="canonical" href="http://www.ivdopia.com">
</head>
<body>
<div id='video' style='background-image: url(final.0.png); background-position:0px 0px; width:320; height:180;' ><a
onclick='document.getElementById("myAudio").play( );'><img src='muteicon.png'/></a><audio id="myAudio" src="audio.mp3" muted=true></audio></img></div>
<!--div id='log'></div-->
<script>
var framerate=12;
var totalImages=16;
```

-continued

```
var totalFrames=2*totalImages*framerate;
var runUpto=totalFrames;
var width=320;
var height=180;
var currentFrame=0;
var totallines=Math.ceil(totalFrames/framerate);
var linesPerFile=Math.ceil(totallines/totalImages);
var framesPerFile=Math.ceil(totalFrames/totalImages);
var currFile=0;
var video=document.getElementById('video');
var log=document.getElementById('log');
var debugLog=function(str) {
if(log) log.innerText+=str+"\n";
}
debugLog(totallines+" " + linesPerFile + " " + totalFrames );
var precache=function( ) {
for(i=1;i<totalImages;i++) {
var image=document.createElement('img');
image.src='final.'+i+'.png';
debugLog(image.src);
}
}
var videoPlayback=undefined;
var autoPlayVideo=function( ) {
videoPlayback=setInterval(function( ) {
currentFrame=currentFrame+1;
if(currentFrame>=runUpto) {
clearInterval(videoPlayback);
videoPlayback=undefined;
return;
}
showFrame(currentFrame);
}, 1000/framerate);
}
var showFrame=function(currFrame) {
var currFile=Math.floor((currFrame-1)/framesPerFile);
currX=width*((currFrame-1)%framerate);
currY=height*Math.floor(((currFrame-1)/framerate)-(linesPerFile*currFile));
debugLog(currFrame+" " + currX+ " " + currY + " " +currFile + " " +linesPerFile);
video.style['background-position']='-'+currX+'px -'+currY+'px';
if(video.style['background-image']!='url(final.'+currFile+'.png)') {
video.style['background-image']='url(final.'+currFile+'.png)';
}
currentFrame=currFrame;
}
precache( );
var audio=document.getElementById("myAudio");
autoPlayVideo( );
var setCurrentTime=undefined;
audio.addEventListener('timeupdate',function( ) {
debugLog("CurrentTime "+this.currentTime);
/*if(setCurrentTime==undefined) {
setCurrentTime=true;
this.currentTime=currentFrame/framerate;
}*/
if(videoPlayback==undefined) {
autoPlayVideo( );
}
showFrame(Math.floor(this.currentTime*framerate));
});
</script>
</body>
</html>
```

The present invention is applicable to all mobile or on-line websites, applications and other video content (e.g., television). The handheld devices that can benefit from the present invention includes all possible electronic devices capable of connecting to the internet and displaying advertising, such as Personal Computer, Notebook, iPad, iPod, iPhone, Android Devices, BlackBerry Devices, Television, and Internet Enabled Television.

The above detailed description is provided to illustrate specific embodiments of the present invention and is not intended to be limiting. Numerous variations and modifications within the scope of the present invention are possible. The present invention is set forth in the accompanying claims.

We claim:

1. A method, comprising:

receiving, by an advertising server, a request from a user device including an identification of content located on the advertising server, the content including a video sequence;

dividing the video sequence into a silent video stream and an audio stream;

extracting from the silent video stream a plurality of still images, the plurality of still images being extracted from the video sequence according to one or more frame rates;

combining the plurality of still images into a composite image for display by a web browser, the composite image including the plurality of still images in a multiple row and multiple column array;

sending the composite image, the audio stream, and playback instructions as separate files to the web browser on the user device in response to the request, the playback instructions including instructions written in a scripting language to cause the web browser, using only resources supported by the web browser and without invoking a native media player on the user device, to:

create a viewport to display a first still image of the plurality of still images, the viewport being embedded in a web page, wherein dimensions of the viewport are equal to dimensions of the first still image;

display the first still image in the viewport by copying the first still image as a bitmap onto a canvas;

start a timer with a duration based on a frame rate between the first still image and a second still image of the plurality of still images to follow the first still image;

in response to the timer timing out, automatically display the second still image in the viewport by copying the second still image as a bitmap onto the canvas;

repeat starting of the timer with the duration based on the one or more frame rates and displaying of the plurality of still images including displaying each of the plurality of still images in the viewport in sequence; and synchronize and play the audio stream concurrently with the displaying of each of the plurality of still images;

wherein each complete row of the composite image is created from a fixed duration of the silent video stream.

2. The method of claim 1, further comprising applying heuristic algorithms to the composite image to facilitate smooth video playback.

3. The method of claim 2, wherein one heuristic algorithm compiles an index for the still images in the composite image.

4. The method of claim 3, wherein the index is used to calculate a position of each of the plurality of still images within the composite image.

5. The method of claim 1, wherein display of each of the plurality of still images in the viewport in sequence is performed according to an index attached to the composite image, the index indicating a predetermined order in which to display the still images.

6. The method as in claim 5, wherein the index is provided separately from the composite image.

7. The method of claim 1, further comprising compressing the composite image.

8. The method of claim 7, wherein compressing the composite image includes using one or more of JPEG and Huffman-based compression algorithms.

9. The method of claim 1, wherein extracting the plurality of still images comprises decomposing each of the plurality of still images into one or more component layers.

10. The method of claim 9, wherein decomposing each still image of the plurality of still images comprises identifying a base still image from a subset of the plurality of still images, and encoding other still images in the subset each as a combination of component layers representing the base still image and one or more incremental changes from the base still image.

11. The method of claim 1, further comprising separately storing the audio stream into a separate file.

12. The method of claim 1, wherein the user device comprises one of: a personal computer, a notebook computer, a tablet computer, an personal digital assistance, a media player, a mobile telephone, and an internet-enabled television.

13. The method of claim 1, wherein sending the composite image, the audio stream, and playback instructions further comprises sending a playback module.

14. The method of claim 1, wherein the one or more frame rates are based on a level of motion in the content.

15. A server, comprising:

an interface for receiving into the server a video sequence for processing; and a processor to:

receive a request from a user device including an identification of content located on an advertising server, the content including a video sequence;

divide the video sequence into a silent video stream and an audio stream;

extract from the silent video stream a plurality of still images, the plurality of still images being extracted from the video sequence according to one or more frame rates; and combine the plurality of still images into a composite image for display by a web browser, the composite image including the plurality of still images arranged in a multiple row and multiple column array; and send the composite image, the audio stream, and playback instructions as separate files to the web browser on the user device in response to the request, the playback instructions including instructions written in a scripting language to cause the web browser, using only resources supported by the web browser and without invoking a native media player on the user device, to:

create a viewport to display a first still image of the plurality of still images, the viewport being embedded in a web page, wherein dimensions of the viewport are equal to dimensions of the first still image;

display the first still image in the viewport by copying the first still image as a bitmap onto a canvas;

start a timer with a duration based on a frame rate between the first still image and a second still image of the plurality of still images to follow the first still image;

in response to the timer timing out, automatically display the second still image in the viewport by copying the second still image as a bitmap onto the canvas;

repeat starting of the timer with the duration based on the one or more frame rates and displaying of the plurality of still images including displaying each of the plurality of still images in the viewport in sequence; and synchronize and play the audio stream concurrently with the displaying of each of the plurality of still images;

wherein each complete row of the composite image is created from a fixed duration of the silent video stream.

16. The server of claim 15, wherein the video sequence comprises a video for advertising.

17. The server of claim 16, wherein the video sequence is received from an advertising server.

18. The server of claim 17, wherein the processor further, when the user device requests the web page from a publisher server, causes the web browser to request the composite image from the advertising server.

19. The server of claim 16, wherein the playback instructions include instructions to display each of the plurality of still images of the composite image at the one or more frame rates in the web browser to provide a video experience to the user device.

20. The server of claim 15, wherein the processor further applies heuristic algorithms to the composite image to facilitate smooth video playback.

21. The server of claim 20, wherein one heuristic algorithm compiles an index for the still images in the composite image.

22. The server of claim 21, wherein the index is used to calculate a position of each of the plurality of still images within the composite image.

23. The server of claim 15, wherein the displaying of each of the plurality of still images in the viewport in sequence is performed according to an index attached to the composite image, the index indicating a predetermined order in which to display the still images.

24. The server as in claim 23, wherein the index is provided separately from the composite image.

25. The server of claim 15, wherein the processor further compresses the composite image.

26. The server of claim 25, wherein the processor further compresses the composite image by using one or more of JPEG and Huffman-based compression algorithms.

27. The server of claim 15, wherein the processor further extracts the plurality of still images by decomposing each still image into one or more component layers.

28. The server of claim 27, wherein decomposing each of the plurality of still images comprises identifying a base still image from a subset of the plurality of still images, and encoding other still images in the subset each as a combination of component layers representing the base still image and one or more incremental change from the base still image.

29. The server of claim 15, further comprising separately storing the audio stream into a separate file.

30. The server of claim 15, wherein the processor further receives and sends over a network.

31. The server of claim 30, wherein the user device comprises one of: a personal computer, a notebook computer, a tablet computer, an personal digital assistance, a media player, a mobile telephone, and an internet-enabled television.

32. The server of claim 15, wherein the one or more frame rates are based on a level of motion in the content.

* * * * *